United States Patent [19]

Johnson

[11] 4,175,331
[45] Nov. 27, 1979

[54] SHAFT BEARING WEAR MEASURING APPARATUS

[75] Inventor: Everett M. Johnson, Fishkill, N.Y.

[73] Assignee: Texaco Inc., White Plains, N.Y.

[21] Appl. No.: 866,594

[22] Filed: Jan. 3, 1978

Related U.S. Application Data

[63] Continuation of Ser. No. 745,252, Nov. 26, 1976, abandoned.

[51] Int. Cl.$^2$ .......................... G01B 7/02; G01B 7/31
[52] U.S. Cl. ................................ 33/172 E; 33/178 E; 33/DIG. 2; 116/208
[58] Field of Search ............. 33/143 L, 147 N, 172 E, 33/174 L, 174 P, 174 Q, 178 E, DIG. 2, DIG. 5, DIG. 17; 116/115, 124 A, DIG. 21, 208, 281, 283

[56] References Cited

U.S. PATENT DOCUMENTS

| | | | |
|---|---|---|---|
| 1,303,387 | 5/1919 | Pogue | 116/115 |
| 2,508,370 | 5/1950 | Bozoian | 33/172 E |
| 2,833,046 | 5/1958 | Jeglum | 33/147 N |
| 3,670,421 | 6/1972 | Kiewicz et al. | 33/174 L |
| 3,744,135 | 7/1973 | Gebel | 33/DIG. 2 |
| 3,839,944 | 10/1974 | Swift | 33/172 E |
| 3,981,621 | 9/1976 | Considine | 116/124 A |

Primary Examiner—Richard R. Stearns
Attorney, Agent, or Firm—Thomas H. Whaley; Carl G. Ries; Ronald G. Gillespie

[57] ABSTRACT

Apparatus for measuring the wear of a shaft bearing includes a source of fluid, a valve, and a linear transducer. The transducer has a probe which may be urged aganst the shaft by admitting fluid from the source to a chamber in the transducer. As the probe is urged against the shaft, voltages provided by the transducer change in a relationship to the movement of the probe. The voltage change is monitored to measure the shaft bearing wear. Upon completion, the fluid is vented, which allows the probe to return to a rest position.

5 Claims, 2 Drawing Figures

SHAFT BEARING WEAR MEASURING APPARATUS

CROSS REFERENCE TO RELATED APPLICATIONS

This application is a continuation to U.S. application Ser. No. 745,252, now abandoned, filed by Everett M. Johnson on Nov. 26, 1976.

BACKGROUND OF THE INVENTION

Field of the Invention

The present invention relates to measuring apparatus in general and, more particularly, to shaft bearing measuring apparatus.

SUMMARY OF THE INVENTION

Apparatus for measuring the wear of a bearing associated with a shaft includes a transducer having a probe which is normally at a reference position. The probe during a measurement is moved in the direction of the shaft until it is stopped by the shaft surface. The travel distance of the probe affects voltages provided by the transducer. Changes in the travel distance, as measured by the voltage change, correspond to bearing wear.

The objects and advantages of the invention will appear more fully hereinafter, from a consideration of the detailed description which follows, taken together with the accompanying drawings wherein one embodiment is illustrated by way of example. It is to be expressly understood, however, that the drawings are for illustrative purposes only and are not to be construed as defining the limits of the invention.

DESCRIPTION OF THE INVENTION

Figure 1:
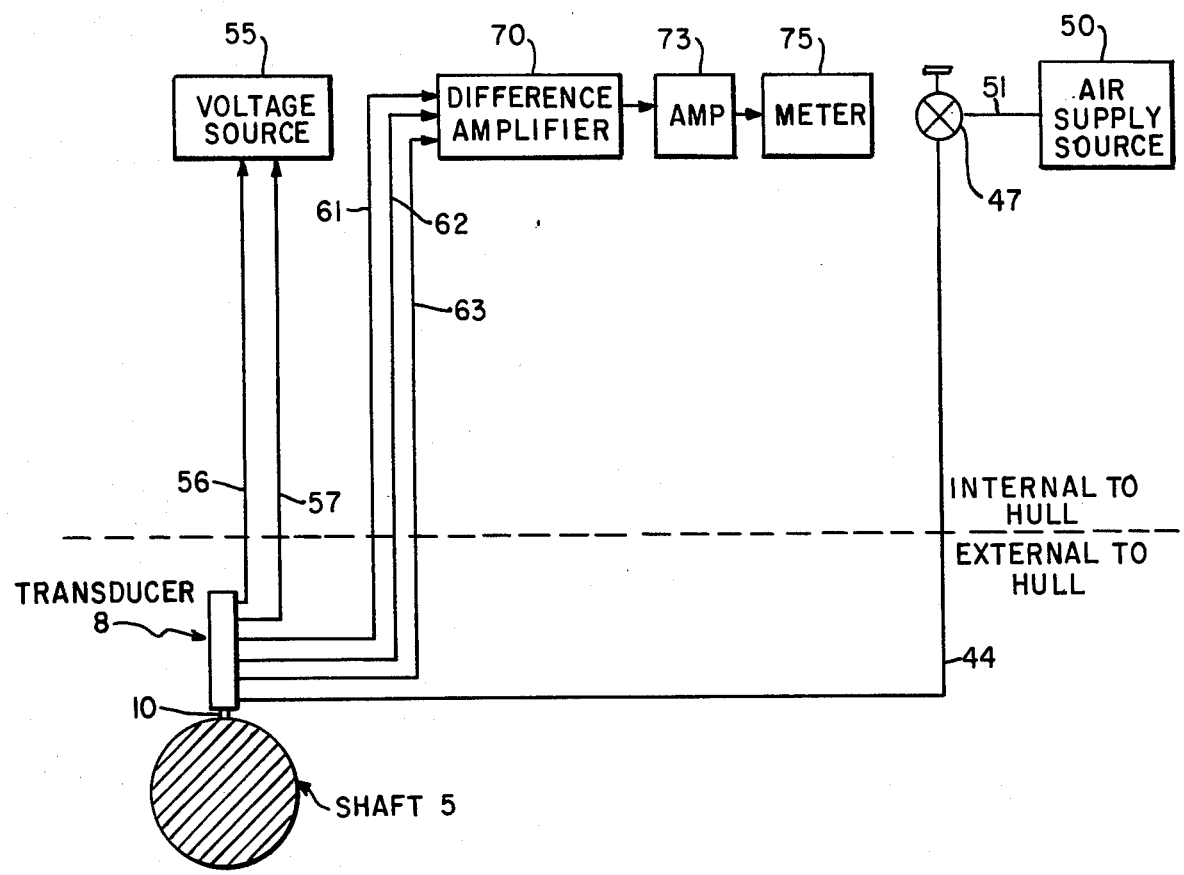
FIG. 1 is a simplified block diagram of a system constructed in accordance with the present invention for measuring the wear of a shaft bearing.
Figure 2:
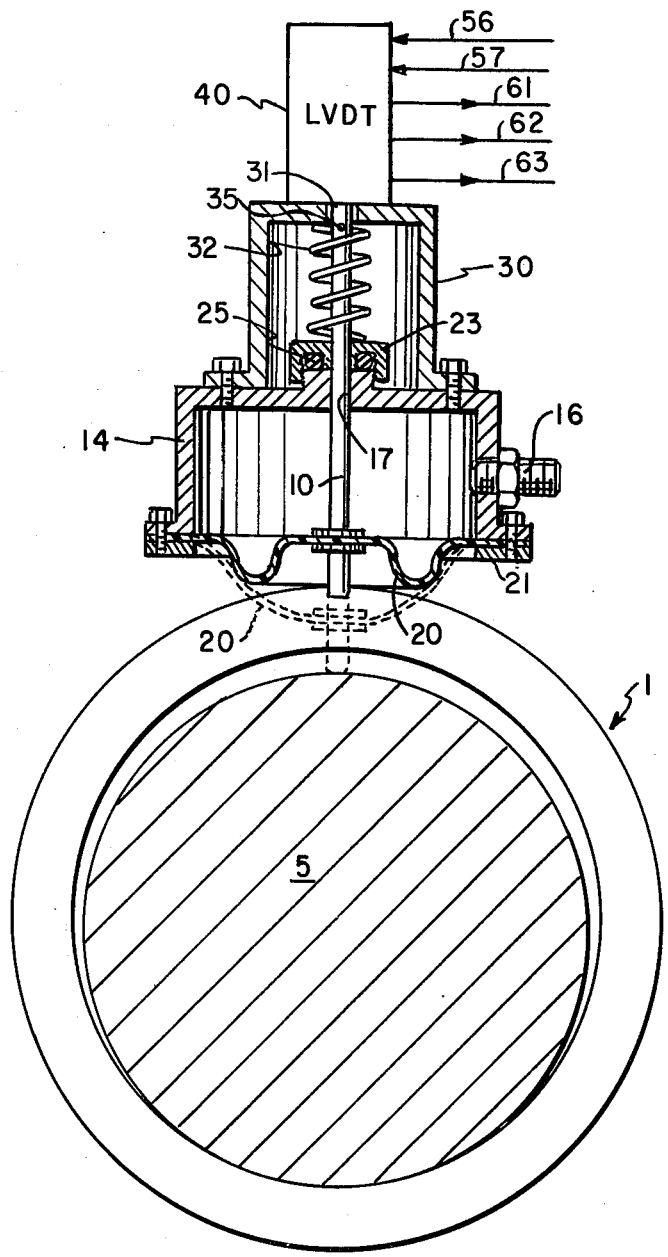
FIG. 2 is a detailed drawing of the transducer shown in FIG. 1.

The wear of a shaft bearing for a ship's propeller shaft may be determined, without removal of the bearing or the shaft. Referring now to FIGS. 1 and 2, a shaft bearing 1, which is external to the hull of a ship, has a propeller shaft 5 resting on its inner surface. Suitably affixed to the outside of the ship and having access to shaft 5 is a transducer 8.

Transducer 8 comprises a movable contact probe 10, an air chamber housing 14 with a conventional type air port fitting 16, and a top opening 17 in which probe 10 is present, a flexible diaphragm 20, affixed to probe 10 and secured to housing 14 by a bezel ring 21, which in part controls the movement of probe 10. A collar 23 is attached to housing 14 around opening 17 so as to compress a seal 25 to seal off the inside of housing 14 while permitting movement of probe 10.

An open bottom spring housing 30 having a top opening 31 is mounted on the top of air chamber housing 14. A return spring 32 is placed around probe 10 having one end in contact with collar 23 and its other end in contact with a pin 35 inserted in probe 10. The size of pin 35 and spring 32 is such that they cannot enter opening 31. Spring 32 in part controls the movement of probe 10.

A conventional type linear voltage differential transformer 40 is attached to housing 30 and has its movable armature (not shown) connected to probe 10. As probe 10 moves, the movable armature also moves accordingly. A primary coil (not shown) of transformer 40 is energized by a voltage as hereinafter explained. The secondary winding (not shown) of transformer 40 is centered-tap so as to provide two secondary voltages. The two secondary voltages correspond to the position of the movable armature.

An air line 44 is connected to air port fitting 16 and to a multiport valve 47 which is connected to an air supply source 50 by way of a line 51. Valve 47 may be operated to either pass air from source 50 to transducer 8 or to block the air from source 50 while venting any air in transducer 8.

A voltage source 55 provides the energizing voltage to the primary winding of transformer 40 by way of lines 56 and 57. The two secondary voltages provided by transformer 40 are carried by lines 61, 62 and 63 to a difference amplifier 70. Difference amplifier 70 provides a difference voltage in accordance with the two secondary voltages to an amplifier 73 which provides an amplified difference voltage to a meter 75. The reading on the meter corresponds to the position of probe 10. It may be calibrated in some linear measurement scale such as inches and fractions thereof or metric equivalents, for example.

Valve 47, air supply source 50, voltage source 55, difference amplifier 70, amplifier 73 and meter 75 are located within the ship.

OPERATION

Valve 47 is operated by an operator to pass air from source 50 through line 44 and fitting 16 into housing 14. As the air pressure in housing 14 increases, diaphragm 20 is flexed so as to urge probe 10 into contact with shaft 5. Thus, the distance of travel by probe 10 is directly related to the displacement of shaft 5. As the inner surface of bearing 1 wears, the travel distance of probe 10 increases.

As probe 10 is urged against shaft 5, its movement compresses return spring 32, moves the core of the linear transducer and changes the secondary voltages provided by transformer 40. The difference between the secondary voltages changes accordingly, so that meter 75 reading relates to the new position of probe 10.

After the measurement has been recorded by the operator, the operator activates valve 47 to block the air from source 50 and to vent the air in transducer 8. Return spring 32 forces probe 10 back to its original position, causing the linear transducer core to return to its original reference position.

The system and method as hereinbefore described measure the wear of a shaft bearing.

What is claimed is:

1. On-line apparatus for measuring the wear of a ship's propeller shaft bearing, comprises determining means for determining the displacement of the ship's propeller shaft in a vertical direction and providing an electrical signal corresponding thereto, the determining means includes a movable member, spacially related to the shaft, moving means connected to the member for moving the member in the vertical direction until the member makes contact with the shaft, said moving means includes an open bottom first housing having a sealed upper opening through which the member passes and a port through which a fluid may enter or exit; a diaphragm affixed to said member and to the bottom portion of said housing forming an expandable chamber within said first housing so that as a fluid enters the expandable chamber the diaphragm is distended in the direction of the shaft, moving the member into contact with the shaft, a supply of fluid, and manually operative means connected to the port in the first housing and to the fluid supply for providing fluid from said supply and for releasing fluid from the expandable chamber, and electrical signal means connected to the movable member for providing the electrical signal in accordance with the position of the movable member; and measurement means connected to the electrical signal means for providing a measurement of the shaft bearing wear in accordance with the electrical signal.

2. Apparatus as described in claim 1 in which the member is initially at a reference position and further comprising returning means connected to the member for returning the member to the reference position.

3. Apparatus as described in claim 1 furthercomprising a pin inserted into the upper portion of said member and in which the returning means includes a second housing mounted on the first housing and having the movable member extending through it, and a return spring arranged with the member and between the pin and the first housing so that as the member is moved towards the shaft by the diaphragm the spring is compressed and so that the spring returns the member to the reference position when the fluid is removed from the expandable chamber.

4. Apparatus as described in claim 3 in which the electrical signal means includes a linear differential voltage transformer having a primary winding, a movable armature connected to the movable member, a secondary winding with a center tap so as to provide two secondary voltages corresponding to the position of the movable armature when the primary winding is energized, means connected to the transformer for providing an energizing voltage to the primary winding of the transformer, and difference amplifier means receiving the secondary voltages from the transformer for providing a difference signal corresponding to the difference between the secondary voltages as the electrical signal.

5. Apparatus as described in claim 4 in which the measurement means includes meter means connected to the difference amplifier means for providing a visual indication corresponding to the bearing wear in accordance with the difference signal.

* * * * *